(12) United States Patent
Siddharthan et al.

(10) Patent No.: US 9,242,614 B2
(45) Date of Patent: Jan. 26, 2016

(54) AIRBAG SYSTEMS WITH ENERGY-ABSORBING COMPONENTS

(71) Applicant: Autoliv ASP, Inc., Ogden, UT (US)

(72) Inventors: Chandrakanth Siddharthan, Troy, MI (US); Conrad C. Dumbrique, Lake Orion, MI (US); James T. Hoskyns, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/201,257

(22) Filed: Mar. 7, 2014

(65) Prior Publication Data

US 2015/0251621 A1  Sep. 10, 2015

(51) Int. Cl.
*B60R 21/05* (2006.01)
*B60R 21/203* (2006.01)
*B60R 21/04* (2006.01)

(52) U.S. Cl.
CPC .............. *B60R 21/05* (2013.01); *B60R 21/2037* (2013.01); *B60R 2021/0414* (2013.01)

(58) Field of Classification Search
CPC ............... B60R 21/05; B60R 21/2037; B60R 2021/04414; B62D 1/046
USPC .................. 280/728.1, 731; 74/552
See application file for complete search history.

(56) References Cited

U.S. PATENT DOCUMENTS

| 5,234,229 | A | 8/1993 | Gordon |
| 6,217,061 | B1 | 4/2001 | Harland et al. |
| 6,402,193 | B1 * | 6/2002 | Fleckenstein ................. 280/731 |
| 6,517,105 | B1 * | 2/2003 | Ford .............................. 280/731 |
| 6,592,141 | B1 * | 7/2003 | Dancasius et al. ......... 280/728.2 |
| 6,675,675 | B1 * | 1/2004 | Sauer et al. ..................... 74/552 |
| 6,758,489 | B2 * | 7/2004 | Xu ............................. 280/728.1 |
| 6,814,369 | B2 * | 11/2004 | Heindl ....................... 280/728.2 |
| 6,942,247 | B2 * | 9/2005 | Simpson ...................... 280/731 |
| 7,055,854 | B2 * | 6/2006 | Jones et al. ................... 280/731 |

(Continued)

FOREIGN PATENT DOCUMENTS

EP        1074435       7/2001
JP        2008149737    7/2008

OTHER PUBLICATIONS

Concise Explanation of Relevance of JP2008149737.

(Continued)

*Primary Examiner* — Paul N Dickson
*Assistant Examiner* — Darlene P Condra
(74) *Attorney, Agent, or Firm* — Phillips Ryther & Winchester; Matthew D. Thayne

(57) ABSTRACT

Airbag systems comprising at least one energy-absorbing component configured to absorb energy generated during the deployment of an airbag cushion. In some embodiments, a system may include a steering wheel assembly and an airbag assembly. The airbag assembly may comprise a housing configured to couple to the steering wheel assembly, an inflator coupled to the housing, and an airbag cushion coupled with the inflator. A first gap may be disposed between the inflator and at least one energy-absorbing component. A force from a deployment of the airbag cushion may cause the first gap to close and may result in contact between the inflator and at least one energy-absorbing component. The contact between the inflator and one or more of the energy-absorbing components transfers energy from the deployment of the airbag to one or more of the energy-absorbing components.

20 Claims, 11 Drawing Sheets

(56) References Cited

U.S. PATENT DOCUMENTS

| | | | |
|---|---|---|---|
| 7,077,427 B2* | 7/2006 | Rhea | 280/731 |
| 2002/0175505 A1* | 11/2002 | Heindl | 280/731 |
| 2007/0193399 A1 | 8/2007 | Vigeant | |
| 2013/0255435 A1 | 10/2013 | Umemura et al. | |
| 2013/0257024 A1 | 10/2013 | Iida et al. | |

OTHER PUBLICATIONS

International Search Report for PCT/US15/18809, Jun. 5, 2015, 2 pgs.
Written Opinion for PCT/US15/18809, Jun. 5, 2015, 6 pgs.

* cited by examiner

AIRBAG SYSTEMS WITH ENERGY-ABSORBING COMPONENTS

SUMMARY

The present disclosure pertains to airbag systems that have at least one energy-absorbing component configured to absorb energy generated during the deployment of an airbag cushion. Some embodiments may be particularly suited to reducing or eliminating mechanical failures in an airbag housing caused by strain generated by deployment of the airbag.

In one particular example, an airbag system may include a steering wheel assembly that comprises a first plurality of energy-absorbing components. The system may also include an airbag assembly that comprises a housing configured to couple to the steering wheel assembly, an inflator coupled to the housing, and an airbag cushion coupled with the inflator. A first gap may be disposed between the inflator and at least one of the first plurality of energy-absorbing components. A force from a deployment of the airbag cushion may causes the first gap to close and may result in contact between the inflator and at least one of the first plurality of energy-absorbing components. The contact between the inflator and the at least one of the first plurality of energy-absorbing components transfers energy from the deployment of the airbag cushion from the inflator to the at least one of the first plurality of energy-absorbing components.

In some embodiments, the first gap may comprise a distance between about 2 mm and about 5 mm. In one specific embodiment, the first gap comprises a distance of about 3 mm. The distance of the first gap may be configured, in some embodiments, to accommodate operation of a horn switch and/or to accommodate coupling the housing to the steering wheel assembly using a snap connector and/or a spring connector.

In some embodiments, one or more of the first plurality of energy-absorbing components may be at least partially hollow. The first plurality of energy-absorbing components may further comprise an angled top surface angled toward a center of the inflator. The angled top surface may be configured to contact the inflator during deployment so as to center the inflator with respect to the energy-absorbing components during deployment of the airbag cushion.

In various embodiments, the first plurality of energy-absorbing components may be configured to contact the inflator along at least a portion of a perimeter of the inflator.

In another example, the housing may be at least partially formed of a plastic material and the first plurality of energy-absorbing components may comprise a magnesium material. The energy-absorbing components may be configured to deform during deployment of the airbag cushion and to dissipate energy as a result of the deformation.

Some embodiments may further include a second plurality of energy-absorbing components and a second gap disposed between the housing and at least one of the second plurality of energy-absorbing components. Force from the deployment may cause the second gap to close and may result in contact between the housing and at least one of the second plurality of energy-absorbing components. The contact between the housing and the at least one of the second plurality of energy-absorbing components may transfer energy from the deployment of the airbag cushion from the housing to the at least one of the second plurality of energy-absorbing components.

In another example, an airbag system may include a mounting component and an airbag assembly. The airbag assembly may comprise a housing configured to couple to the mounting wheel assembly, an inflator coupled to the housing, and an airbag cushion coupled with the inflator. The system may further include at least one energy-absorbing component. A first gap may be disposed between the airbag assembly and the at least one energy-absorbing component. The system may be configured such that a force from deployment of the airbag cushion causes the first gap to close and results in contact between the airbag assembly and the at least one energy-absorbing component. The contact between one of the airbag assembly and the housing and the at least one energy-absorbing component may absorb energy from the deployment of the airbag cushion.

In some embodiments, the energy-absorbing component may extend from the airbag assembly, while in other embodiments, the at least one energy-absorbing component extends from the housing. Still further, the at least one energy-absorbing component may comprise a plurality of crushable ribs or may comprise a deformable post.

The airbag assembly may be configured in various embodiments to be operable with one of a driver's side airbag, a passenger's side airbag, and a side curtain airbag.

The features, structures, steps, or characteristics disclosed herein in connection with one embodiment may be combined in any suitable manner in one or more alternative embodiments and/or implementations.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
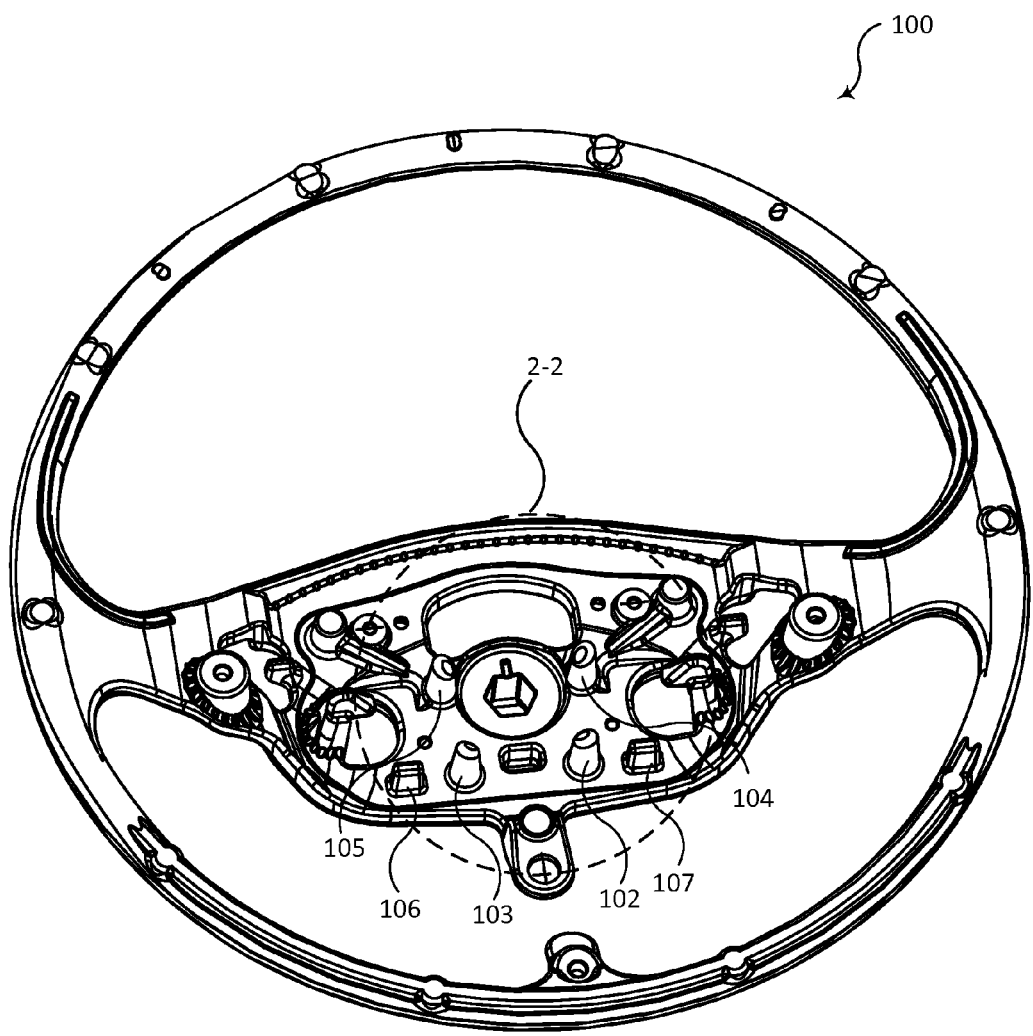
FIG. 1 depicts perspective view of a steering wheel assembly comprising energy-absorbing components configured to be disposed in proximity to an airbag housing consistent with embodiments of the present disclosure.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein relate to absorbing energy generated during deployment of an airbag. In some instances, the forces generated during deployment may exert significant stress on components associated with the air bag, such as the airbag housing, which may couple the airbag and the airbag inflator to a vehicle mount. In particular, the acceleration of the inflator in one direction and the pull of the cushion in the opposite direction may exert significant strain on the housing. Such strain may result in mechanical failures of components, such as an airbag housing. Although such failures may be ameliorated by using stronger materials (e.g., using metal in place of plastic), such materials may increase the cost and/or complexity of producing an airbag. Further, the conditions in which deployment of the airbag occurs may also affect the performance of the airbag. For example, increased temperature may make components of the airbag more pliable and may increase the energy with which an airbag deploys.

Disclosed herein are various embodiments of airbag systems configured to address one or more of these concerns, and/or other concerns. Some embodiments may be configured to absorb and/or transfer a portion of the energy generated by deployment of the airbag into a component to which an airbag is mounted. Such features may allow for use of materials that are less costly and/or may simplify the manufacturing and/or installation of an airbag in a vehicle. Further, such features may also reduce or eliminate mechanical failures caused by deployment of the airbag.

FIG. 1 depicts perspective view of a steering wheel assembly 100 including a first plurality of energy-absorbing components 102-105 configured to be disposed in proximity to an airbag inflator (not shown) consistent with embodiments of the present disclosure. A second plurality of energy-absorbing components 106-107 may also be provided, and may be configured to be disposed in proximity to an airbag housing (not shown) configured to couple to the steering wheel assembly 100.

In various embodiments, one or more of the energy-absorbing components 102-107 may be integrally formed with steering wheel assembly 100. In other embodiments, one or more of the energy-absorbing components 102-107 may be distinct components that may be fastened or otherwise coupled to a steering wheel assembly. In some embodiments, steering wheel assembly 100 and one or more of energy-absorbing components 102-107 may be formed of magnesium. More specifically, steering wheel assembly 100 may comprise Magnesium alloy (AM50), which may yield when the inflator (not shown) is in contact with high force and absorb a portion of energy from the inflator. Further, the yielding of the inflator may help to protect an airbag housing (not shown) from failure as a result of mechanical stress caused by the deployment of the airbag.

A variety of alternative materials may be used, however, to form the energy-absorbing component(s). For example, in some embodiments, a polyurethane material, such as polyurethane foam, may be used to form one or more energy-absorbing components. In some such embodiments, the polyurethane may be molded onto a steering wheel frame and may be formed into one or more energy-absorbing components at selected locations on the steering wheel frame.

The energy-absorbing components 102-107 may be configured to deform, either elastically or non-elastically, upon the deployment of an airbag. The deformation of the energy-absorbing components 102-107 may help to dissipate energy and/or provide structural support to prevent mechanical failure of components associated with an airbag (not shown). In other words, the contact between the inflator and one or more of energy-absorbing components 102-105 may transfer energy from the deployment of the airbag from the inflator to one or more of the energy-absorbing components 102-105. Similarly, contact between the housing (not shown) and one or more of the second plurality of energy-absorbing components 106, 107 may transfer energy released during the deployment of the airbag from the housing to the at least one of the second plurality of energy-absorbing components 106, 107.

Figure 2:
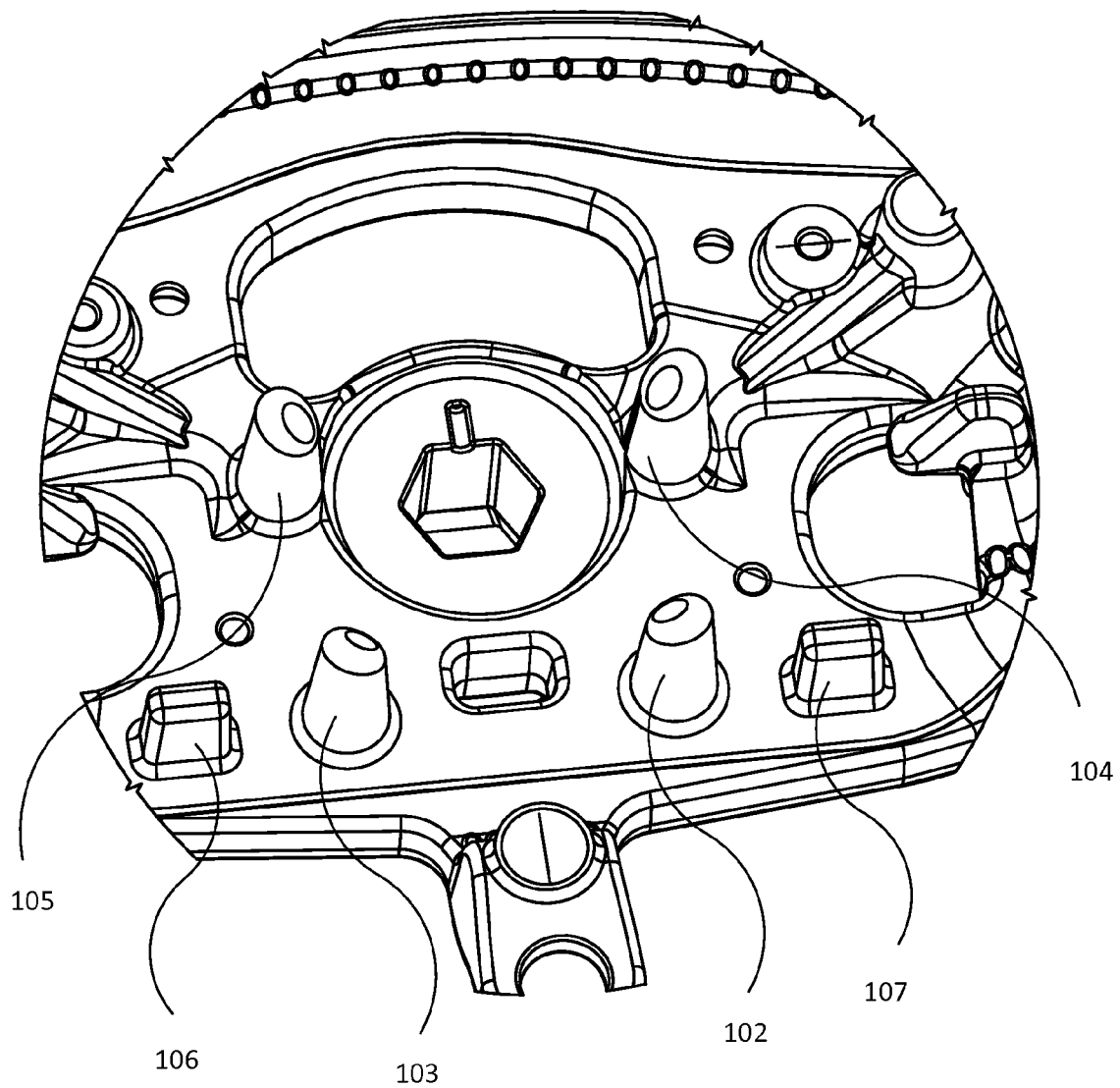
FIG. 2 depicts a detailed view of the steering wheel assembly of FIG. 1 encircled by the line 2-2 consistent with embodiments of the present disclosure.

FIG. 2 depicts a detail view of the steering wheel assembly of FIG. 1 encircled by the line 2-2 consistent with embodiments of the present disclosure. The detailed portion shown in FIG. 2 illustrates a component that may allow for an airbag housing to be mounted to the steering wheel assembly using a snap component and/or a spring mounting component.

Figure 3:
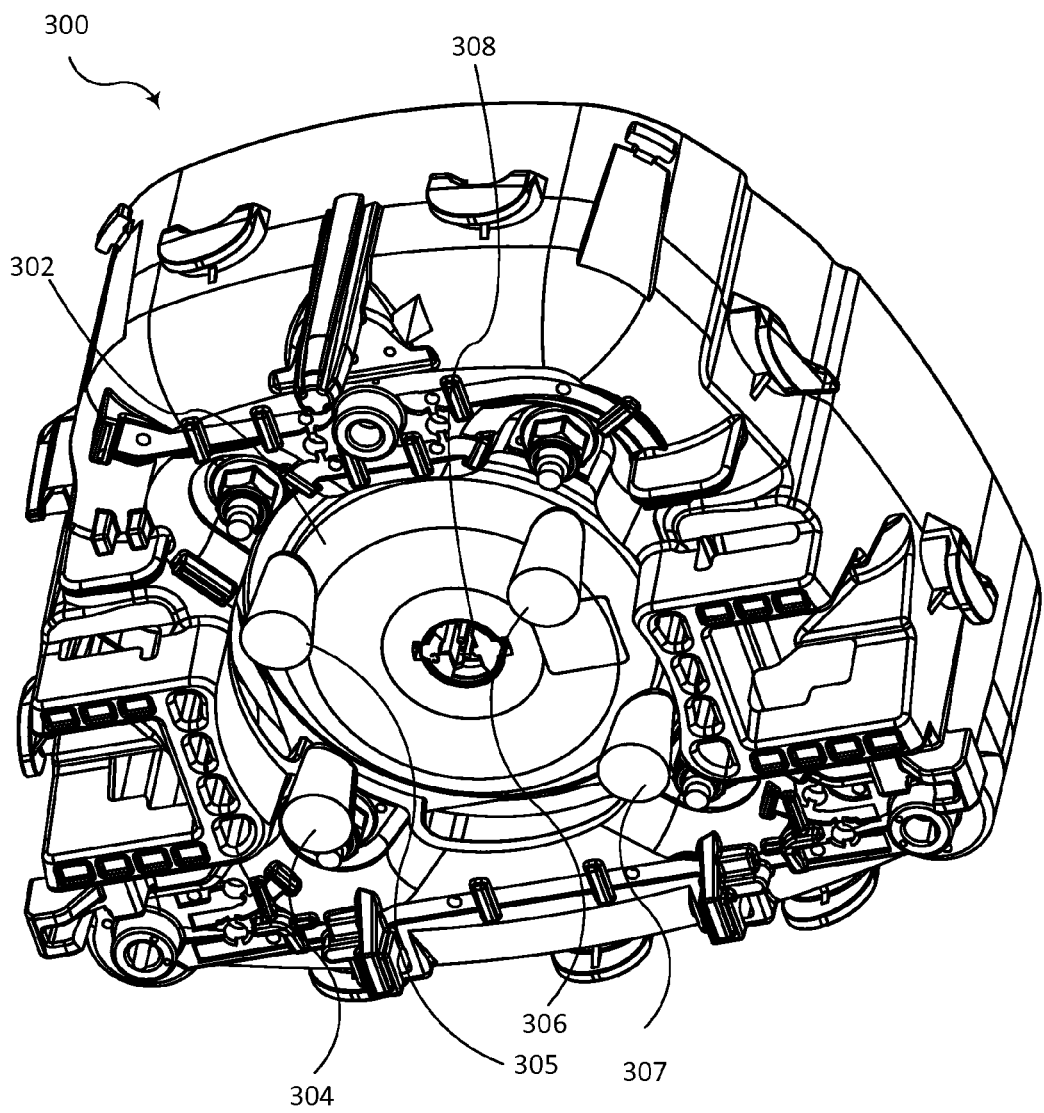
FIG. 3 depicts a bottom perspective view of an airbag housing and an airbag inflator consistent with embodiments of the present disclosure.

FIG. 3 depicts a bottom perspective view of an airbag housing 300, an airbag inflator 302, and a plurality of energy-absorbing components 304-307 associated with a steering wheel component. The airbag housing 300 may be configured to couple to a steering wheel component (not shown in FIG.

3). In one embodiment, the airbag housing 300 may be configured to couple to the steering wheel assembly illustrated in FIG. 1.

Returning to a discussion of FIG. 3, the inflator 302 may be mounted in the airbag housing. An aperture 308 in the inflator 302 may permit passage of wiring to the inflator. When the inflator 302 is activated and the airbag (not shown) deploys, the force generated by the inflator 302 may cause the inflator 302 to move in the direction of the plurality of energy-absorbing components 304-307. As is illustrated and described in greater detail in FIGS. 5-7, a gap may be disposed between the plurality of energy-absorbing components 304-307 and an airbag inflator and/or an airbag housing. The force of the deployment may cause the gap to close, resulting in contact between the airbag inflator and/or housing and one or more of the plurality of energy-absorbing components 304-307.

Figure 4:
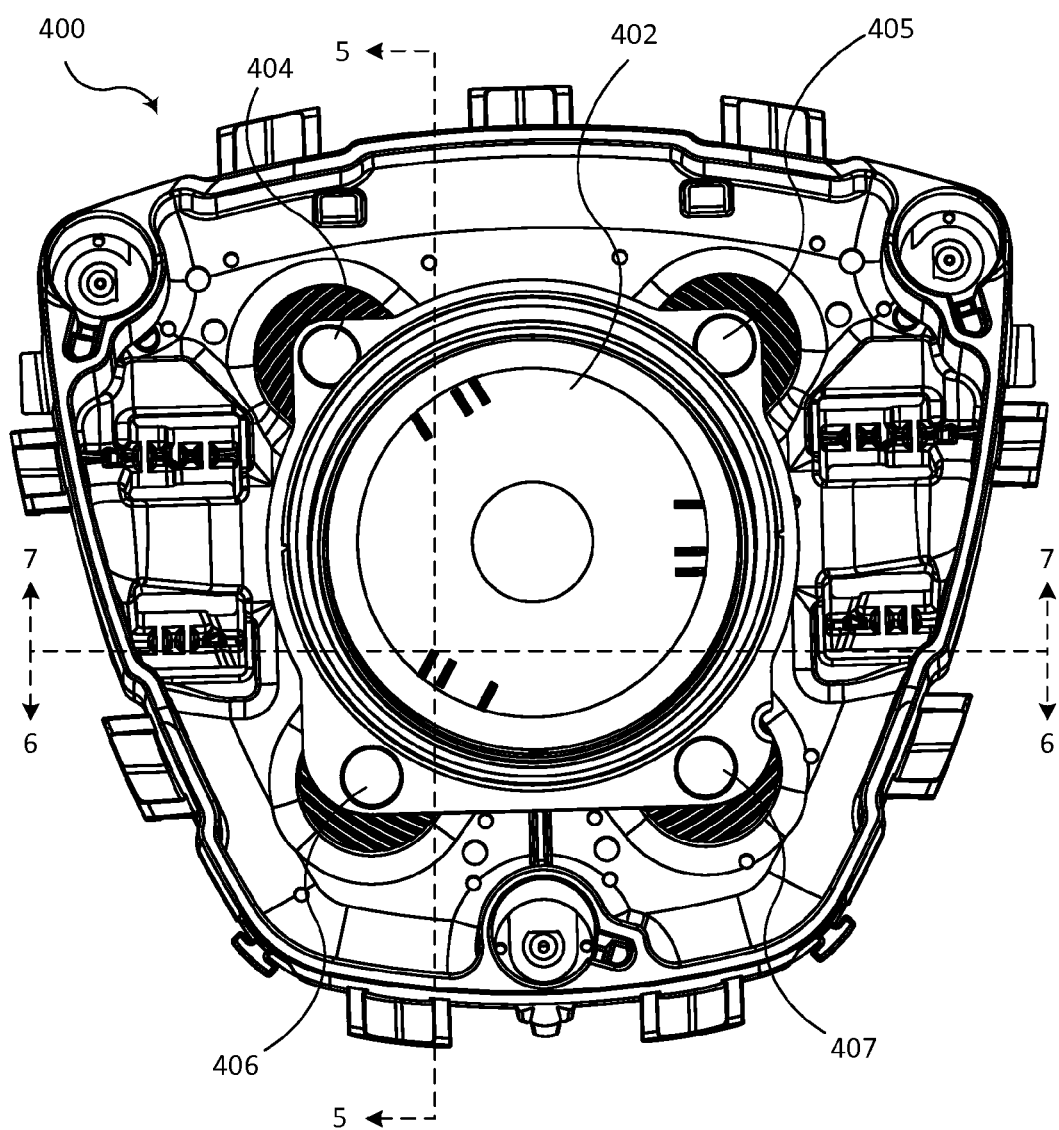
FIG. 4 depicts a top plan view of an airbag housing and an airbag inflator consistent with embodiments of the present disclosure.

FIG. 4 depicts a top plan view of an airbag housing 400 and an airbag inflator 402 consistent with embodiments of the present disclosure. The inflator 402 may be mounted to housing 400 using fasteners 404-407. In certain embodiments, the fasteners 404-407 may comprise a plurality of bolts configured to fasten to a plurality of nuts (not shown) disposed on the opposite side of housing 400.

Figure 5:
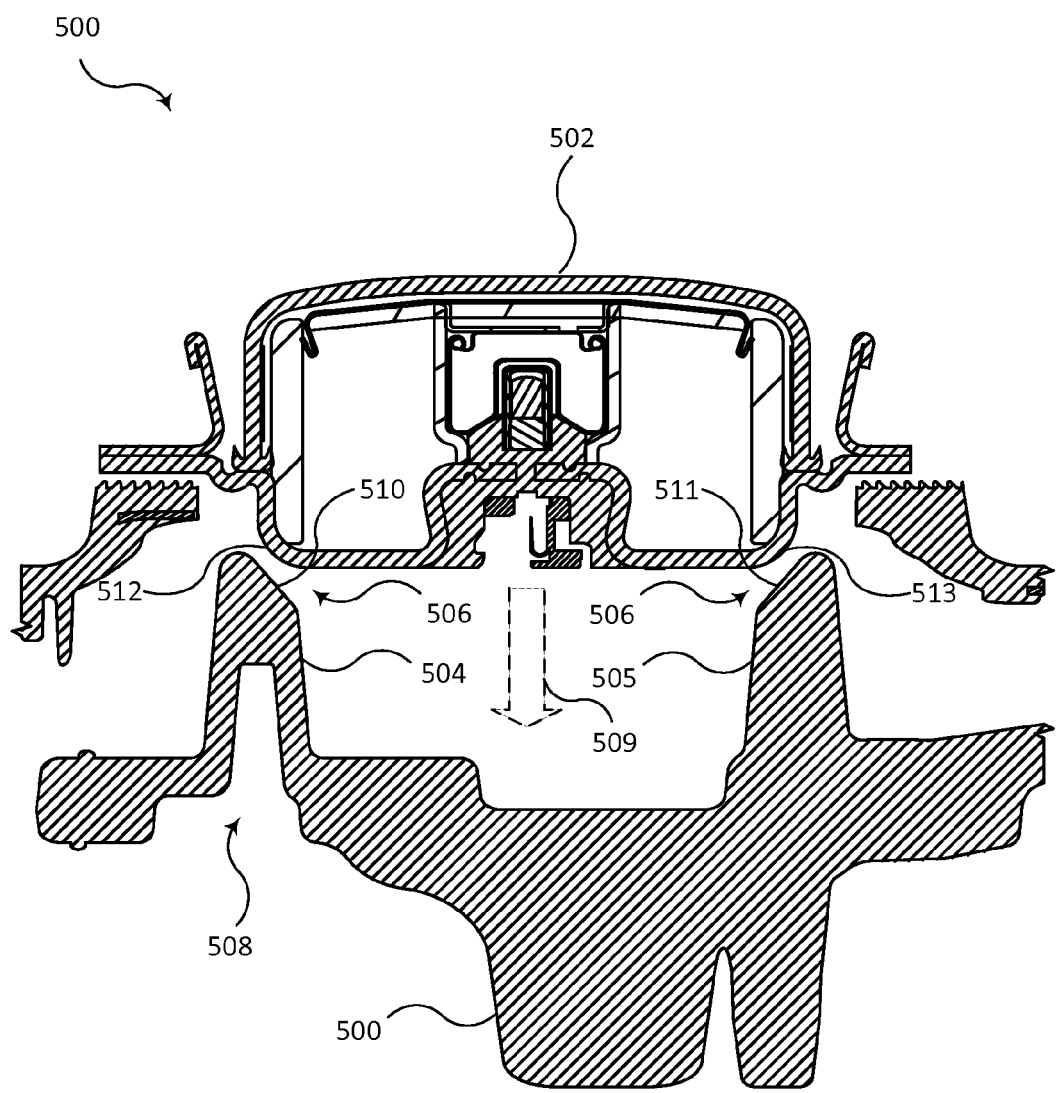
FIG. 5 depicts a cross-sectional view of a steering wheel assembly including energy-absorbing components disposed in proximity to an airbag inflator and taken along the line 5-5 in FIG. 4, consistent with embodiments of the present disclosure.

FIG. 5 depicts a cross-sectional view of a steering wheel assembly 500 including energy-absorbing components 504, 505 disposed in proximity to an airbag inflator 502 and taken along the line 5-5 in FIG. 4. In the illustrated embodiment, energy-absorbing component 504 is at least partially hollow. More particularly, energy-absorbing component 504 defines a void 508 extending partially along its length. Void 508 may permit deformation of energy-absorbing component 504 at a lower energy level than would be required if energy-absorbing component 504 were solid. However, depending upon the materials used, other embodiments are contemplated in which one or more of the energy-absorbing components are solid. In the illustrated embodiment, energy-absorbing components 504, 505 are integrally formed with steering wheel assembly 500. In alternative embodiments, one or more of the energy-absorbing components may be formed separately from steering wheel assembly 500 and later fastened, adhered, or otherwise coupled with another component of an airbag system at an appropriate location.

A gap 506 may separate the airbag inflator 502 from the energy-absorbing components. In one embodiment, the gap 506 may permit a limited distance of travel in the direction indicated by arrow 509 prior to making contact with the energy-absorbing components. In some embodiments, the limited amount of travel may facilitate appropriate deployment of an airbag (not shown) in communication with inflator 502. In one specific embodiment, the gap 506 may be approximately 3 mm. In other embodiments the gap 506 may be larger than 3 mm or smaller than 3 mm.

The gap 506 may serve various functions in different embodiments. For example, in some embodiments, the gap 506 may accommodate operation of a horn switch (not shown) mounted into the steering wheel assembly 500. The horn switch may be actuated when a user depresses a portion of the steering wheel. In some embodiments, the gap 506 may be reduced or eliminated when the horn switch is activated. In some such embodiments, for example, gap 506 may comprise a distance at least substantially identical to, or otherwise configured to accommodate, a corresponding distance required to actuate a horn switch upon depression of a portion of a steering wheel. In other embodiments, the gap 506 may facilitate mounting an airbag housing to a mounting component. The gap 506 may allow for use of snap connections (not shown) or spring connections (not shown) to be used to couple the airbag housing to the mounting component. Use of a snap component, for example, may involve the housing being coupled to the mounting component by pushing one or more connectors on the housing onto corresponding connectors on the mounting component. The pressure exerted during installation may, in some embodiments, cause the gap 506 to partially or completely close as the housing is coupled to the mounting component.

In some embodiments, the energy-absorbing components may comprise asymmetrical surfaces configured to facilitate desired deployment characteristics. For example, in the embodiment depicted in FIG. 5, the energy-absorbing components 504, 505 include angled top surfaces 510, 511, respectively, that extend away from a center of the respective energy-absorbing surfaces at a different angle than an opposite surface. In the illustrated embodiment, the top surfaces 510, 511 are angled toward a center of the inflator 502. The angled top surfaces 510, 511 may help to keep inflator 502 centered between the energy-absorbing components 504, 505 as the inflator 502 moves in the direction indicated by arrow 509. Of course, other embodiments are contemplated in which the energy-absorbing components may similarly keep an inflator centered during deployment by angling one or more surfaces but without making these components non-symmetrical. For example, the surfaces opposite the angled surfaces 510, 511 may have the same shape so as to make the components symmetrical if desired.

Further, the angled top surfaces 510, 511 may be disposed proximate to corners 512, 513, respectively, of the inflator 502. In some embodiments, the angled top surfaces 510, 511 may, be shaped to receive and/or direct the corners 512, 513 during deployment. In various embodiments, energy-absorbing components may be disposed in proximity to one or more portions of an outer edge or circumference of the inflator.

Figure 6A:
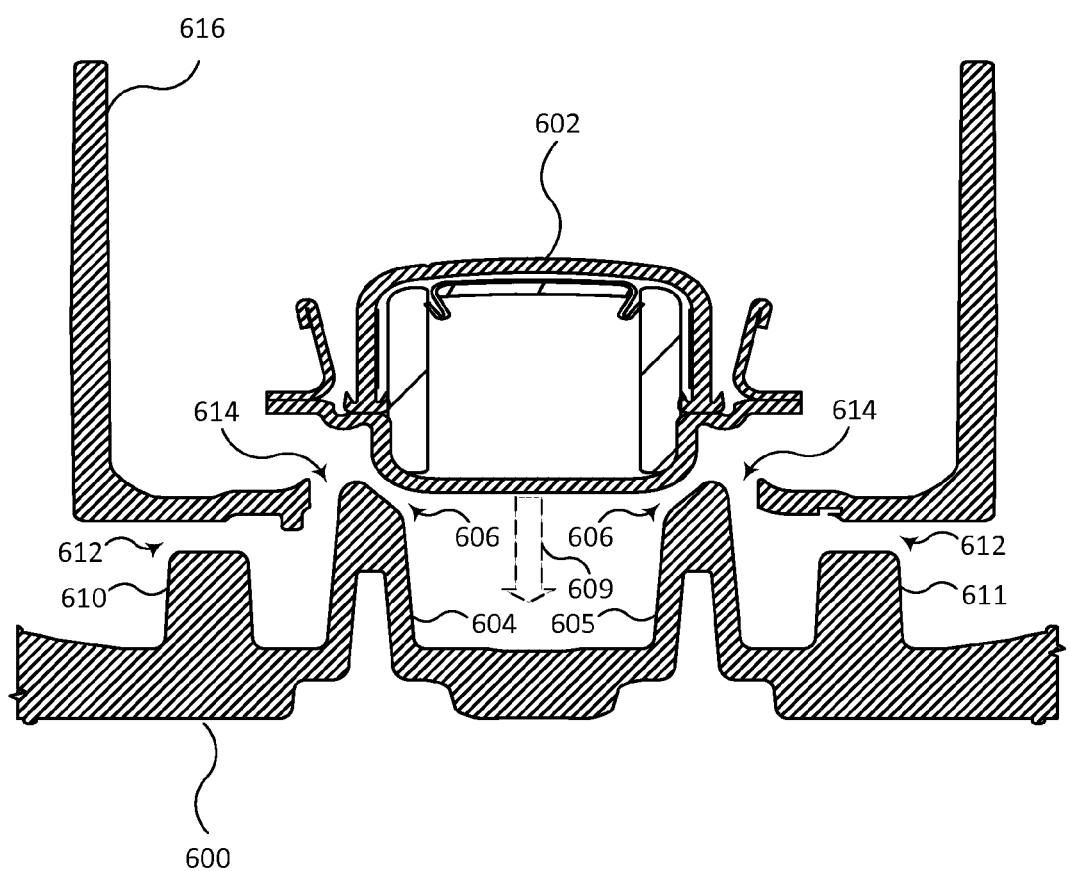
FIG. 6A depicts a cross-sectional view of a steering wheel assembly including a first plurality of integrally-formed energy-absorbing components, which are separated by a first gap from an inflator mounted to an airbag housing and taken along line 6-6 in FIG. 4, consistent with embodiments of the present disclosure.

FIG. 6A depicts a cross-sectional view of a steering wheel assembly 600 comprising a first plurality of integrally-formed energy-absorbing components 604, 605, which are separated by a first gap 606 from an inflator 602 mounted to an airbag housing 616 and taken along line 6-6 in FIG. 4, consistent with embodiments of the present disclosure. The first gap 606 may permit a limited distance of travel in the direction indicated by arrow 609. The limited amount of travel may facilitate appropriate deployment of an airbag (not show) in communication with inflator 602. Steering wheel assembly 600 also comprises a second plurality of integrally-formed energy-absorbing components 610, 611, which are separated by a second gap 612 from the airbag housing 616. The inflator 602 may be disposed in proximity to an aperture 614 in housing 616. In some embodiments, inflator 602 may extend partially through aperture 614. In some embodiments, the second gap 612 may comprise a distance at least substantially identical to the first gap 606.

Figure 6B:
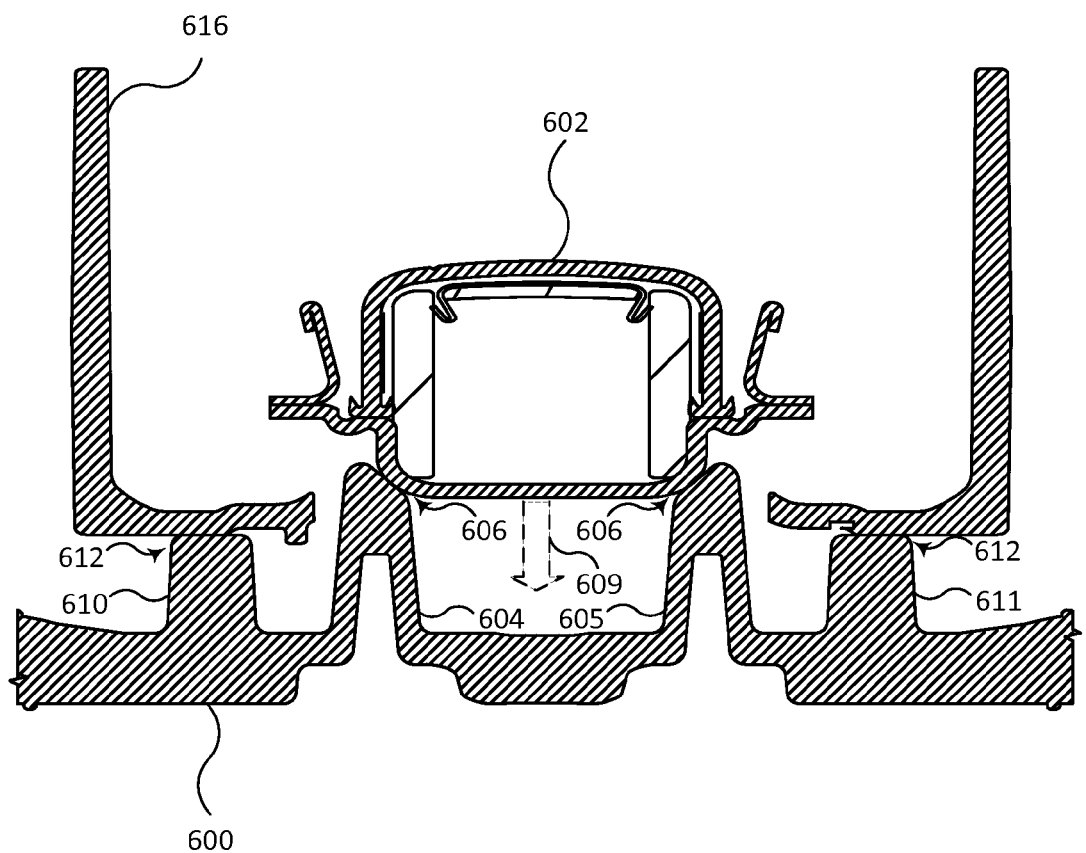
FIG. 6B depicts a cross-sectional view of the steering wheel assembly of FIG. 6A during deployment with the inflator in contact with the energy-absorbing components consistent with embodiments of the present disclosure.

FIG. 6B is a cross-sectional view of the steering wheel assembly of FIG. 6A shown during deployment of an airbag such that the inflator 602 is in contact with the first plurality of energy-absorbing components 604, 605. As described above, energy released during activation of inflator 602 may cause inflator 602 to move in the direction indicated by arrow 609. The relative motion between the inflator 602 and the steering wheel assembly 600 may cause the first gap 606 to close. As illustrated in FIG. 6B, the inflator 602 may contact the first plurality of energy-absorbing components 604, 605 and may transfer energy from the inflator 602 to energy-absorbing components 604, 605.

The inflator 602 may be coupled to the housing 616, and as a result of movement of the inflator 602, the housing 616 may also move relative to steering wheel assembly 600. The relative motion between the housing 616 and the steering wheel assembly 600 may also cause the second gap 612 to close. The housing 616 may contact the second plurality of energy-absorbing components 610, 611 and may transfer energy from the housing 616 to energy-absorbing components 610, 611.

Figure 7:
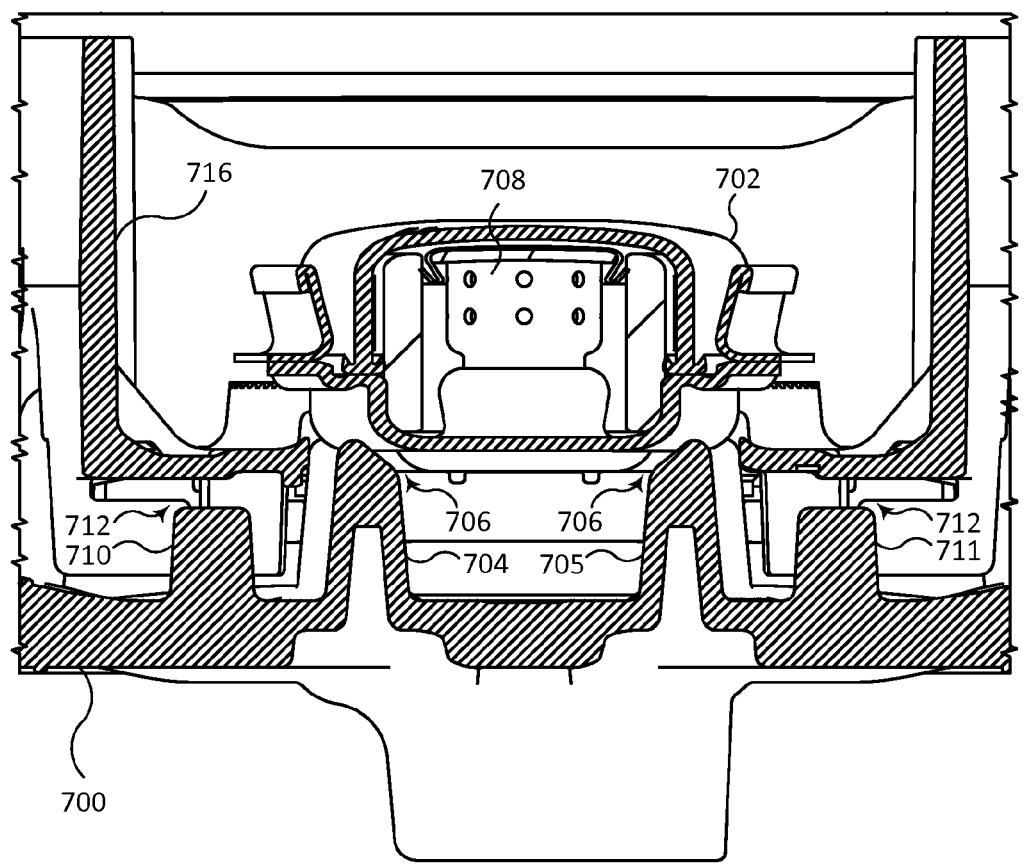
FIG. 7 depicts a cross-sectional view of a steering wheel assembly including energy-absorbing components disposed in proximity to an airbag inflator and an airbag housing taken along line 7-7 in FIG. 4, consistent with embodiments of the present disclosure.

FIG. 7 depicts a cross-sectional view of a steering wheel assembly 700 comprising energy-absorbing components disposed in proximity to an airbag inflator 702 and an airbag housing 716 taken along line 7-7 in FIG. 4. Airbag inflator 702 comprises a diffuser 708. Energy-absorbing components 704, 705 are separated by a first gap 706 from inflator 702 mounted to an airbag housing 716. Steering wheel assembly 700 also includes a second plurality of integrally-formed energy-absorbing components 710, 711, which are separated by a second gap 712 from the airbag housing 716.

Figure 8:
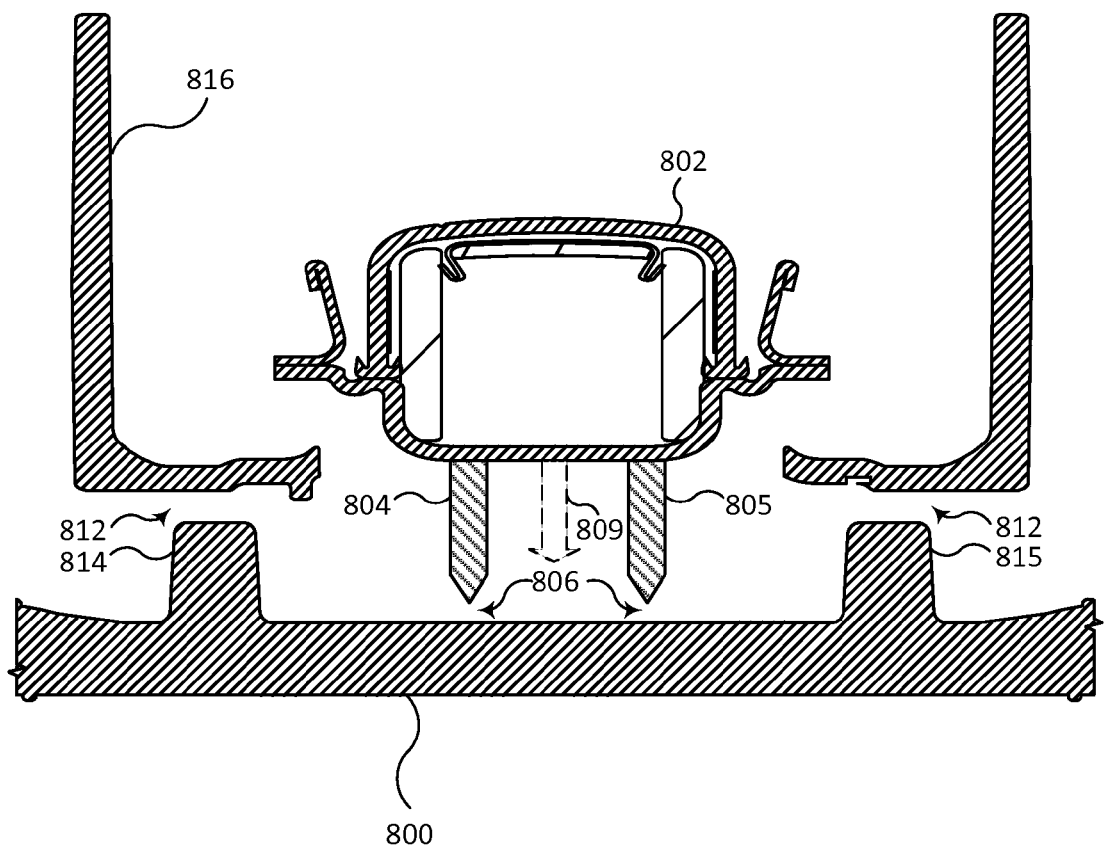
FIG. 8 depicts a cross-sectional view of a mounting assembly, an airbag inflator, and an airbag housing including a first plurality of energy-absorbing components extending from the airbag inflator and disposed in proximity to the mounting assembly consistent with embodiments of the present disclosure.

FIG. 8 depicts a cross-sectional view of a mounting assembly 800, an airbag inflator 802, and an airbag housing 816 comprising a first plurality of energy-absorbing components 804, 805 extending from the inflator 802 of an airbag assembly and disposed in proximity to the mounting assembly 800. Mounting assembly 800 may be configured to operate in conjunction with a passenger's side airbag, a driver's side airbag, a side airbag curtain, and the like.

Unlike the energy-absorbing components of the previous embodiments, which comprise posts, in the illustrated embodiment, the first plurality of energy-absorbing components 804, 805 comprise ribs that extend from the bottom of inflator 802. A first gap 806 may separate the first plurality of energy-absorbing components 804, 805 from mounting assembly 800. A second plurality of energy-absorbing components 814, 815 may extend from mounting assembly 800 toward housing 816. A second gap 812 may separate the second plurality of energy-absorbing components 814, 815 from housing 816. The first plurality of energy-absorbing components 804, 805 may also be described as crush ribs. The crush ribs 804, 805 may absorb energy generated by inflator 802 as inflator 802 moves in the direction indicated by arrow 809.

Figure 9:
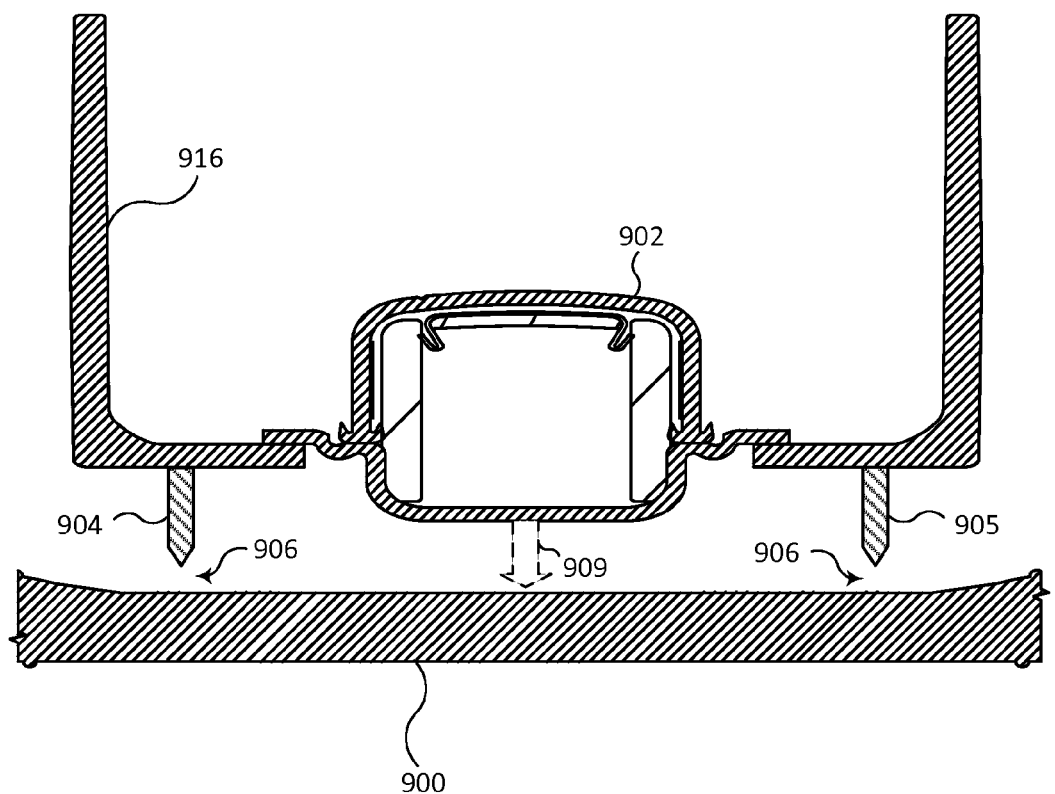
FIG. 9 depicts a cross-sectional view of a mounting assembly, an airbag inflator, and an airbag housing including a first plurality of energy-absorbing components extending from the airbag housing and disposed in proximity to the mounting assembly consistent with embodiments of the present disclosure.

FIG. 9 depicts a cross-sectional view of a mounting assembly 900, an airbag inflator 902, and an airbag housing 916 comprising a first plurality of energy-absorbing components 904, 905 extending from the airbag housing 916 and disposed in proximity to the mounting assembly 900 consistent with embodiments of the present disclosure. In the illustrated embodiment, the energy-absorbing components 904, 905 extend from the bottom of the housing 916. A gap 906 may separate the energy-absorbing components 904, 905 from the mounting assembly 900. The energy-absorbing components 904, 905 may absorb energy generated by the inflator 902 as the inflator 902 moves in the direction indicated by the arrow 909.

Figure 10:
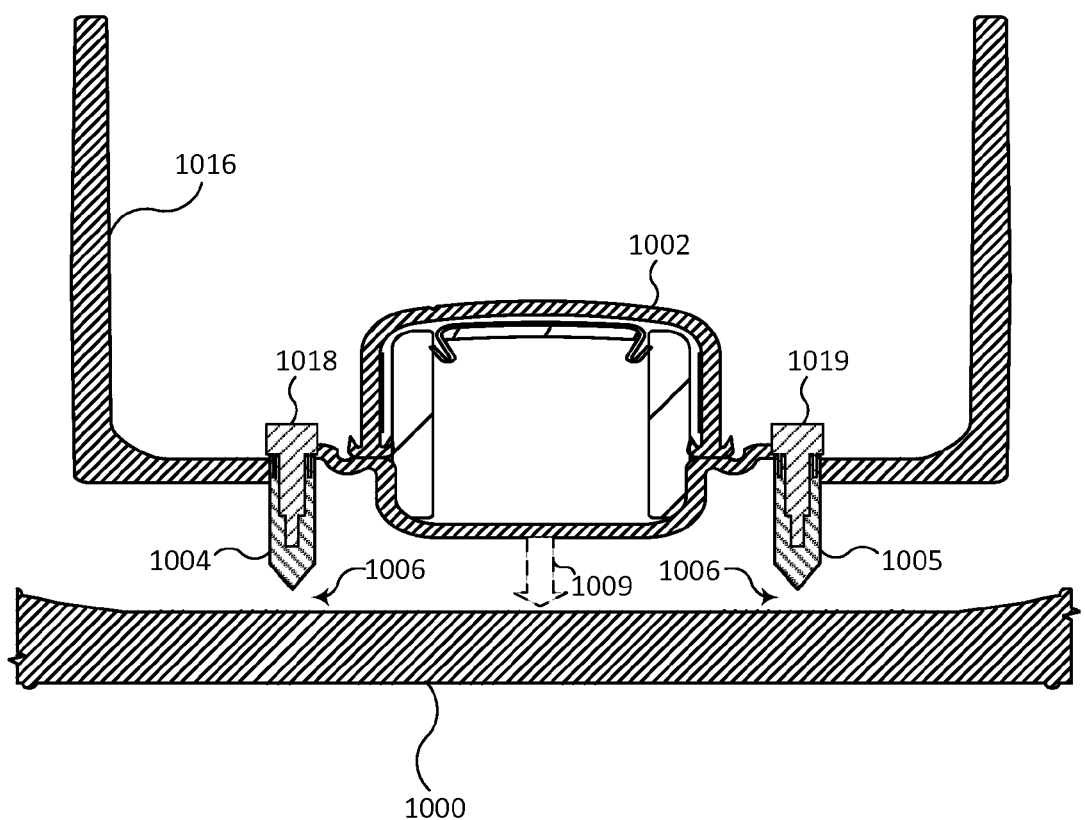
FIG. 10 depicts a cross-sectional view of a mounting assembly, an airbag inflator, and an airbag housing including a first plurality of energy-absorbing components extending from a plurality of fasteners configured to couple the airbag housing to the airbag inflator and disposed in proximity to the mounting assembly consistent with embodiments of the present disclosure.

FIG. 10 depicts a cross-sectional view of a mounting assembly 1000, an airbag inflator 1002, and an airbag housing 1016 comprising energy-absorbing components 1004, 1005 extending from a plurality of fasteners 1018, 1019, respectively, which are configured to couple the airbag housing 1016 to the airbag inflator 1002. Energy-absorbing components 1004 and 1005 are disposed in proximity to the mounting assembly 1000. In one embodiment, the plurality of fasteners 1018, 1019 may be threaded and may be configured to couple the inflator 1002 to the housing 1016 using the threads. The energy-absorbing components 1004, 1005 may be configured to receive a threaded portion of the plurality of fasteners 1018, 1019. In alternative embodiments, other connections between the plurality of fasteners 1018, 1019 may be utilized or, alternatively, the energy-absorbing components may be configured to be fitted over one or more fasteners such as, for example, by way of a friction or flex fit. The energy-absorbing components 1004, 1005 may absorb energy generated by inflator 1002 as inflator 1002 moves in the direction indicated by arrow 1009.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag system, comprising:
 a steering wheel assembly, comprising:
  a first plurality of energy-absorbing components;
 an airbag assembly, comprising:
  a housing configured to couple to the steering wheel assembly;
  an inflator coupled to the housing, wherein the first plurality of energy-absorbing components extend from the steering wheel assembly towards the inflator; and
  an airbag cushion in fluid communication with the inflator; and
 a first gap disposed between the inflator and at least one of the first plurality of energy-absorbing components;
 wherein the system is configured such that a force from a deployment of the airbag cushion causes the first gap to close and results in contact between an inflator body of the inflator and at least one of the first plurality of energy-absorbing components, and wherein the contact between the inflator and the at least one of the first plurality of energy-absorbing components transfers energy from the deployment of the airbag cushion from the inflator to the at least one of the first plurality of energy-absorbing components.

2. The system of claim 1, wherein the first gap comprises a distance between about 2 mm and about 5 mm.

3. The system of claim 2, wherein the first gap comprises a distance of about 3 mm.

4. The system of claim 1, wherein the first gap is further configured to close to accommodate operation of a horn switch.

5. The system of claim 1, wherein the first gap is further configured to accommodate coupling the housing to the steering wheel assembly using at least one of a snap connector and a spring connector.

6. The system of claim 1, wherein at least one of the first plurality of energy-absorbing components is at least partially hollow.

7. The system of claim 1, wherein at least one of the first plurality of energy-absorbing components comprises an angled top surface angled toward a center of the inflator, and wherein the angled top surface is configured to contact the inflator during deployment so as to center the inflator with respect to the energy-absorbing components during deployment of the airbag cushion.

8. The system of claim 1, wherein the first plurality of energy-absorbing components are configured to contact the inflator along at least a portion of a perimeter of the inflator.

9. The system of claim 1, wherein the housing is at least partially formed of a plastic material.

10. The system of claim 1, wherein the first plurality of energy-absorbing components comprise a magnesium material.

11. The system of claim 1, further comprising:
a second plurality of energy-absorbing components;
a second gap disposed between the housing and at least one of the second plurality energy-absorbing components;
wherein the system is configured such that force from the deployment further causes the second gap to close and results in contact between the housing and at least one of the second plurality of energy-absorbing components, wherein the contact between the housing and the at least one of the second plurality of energy-absorbing components transfers energy from the deployment of the airbag cushion from the housing to the at least one of the second plurality of energy-absorbing components.

12. The system of claim 1, wherein the energy-absorbing components are configured to deform during deployment of the airbag cushion and to dissipate energy as a result of the deformation.

13. An airbag system, comprising:
a mounting component;
an airbag assembly, comprising:
a housing configured to couple to the mounting component;
an airbag cushion; and
an inflator in fluid communication with the airbag cushion and coupled to the housing;
a plurality of energy-absorbing components, wherein each of the plurality of energy-absorbing components is crushable; and
a first gap disposed between the plurality of energy-absorbing components and at least one of the mounting component and the inflator;
wherein the system is configured such that a force from deployment of the airbag cushion causes the inflator to move relative to at least one of the housing and the mounting component to thereby cause the first gap to at least partially close and results in contact between the plurality of energy-absorbing components and at least one of the inflator and the mounting component, wherein the contact absorbs energy from the deployment of the airbag cushion, and wherein the plurality of energy-absorbing components at least one of extends from respective corners of the inflator and is configured to contact respective corners of the inflator during deployment of the airbag cushion.

14. The system of claim 13, wherein the plurality of energy-absorbing components extends from the mounting component.

15. The system of claim 13, wherein the plurality of energy-absorbing components extends from the inflator.

16. The system of claim 13, wherein the plurality of energy-absorbing components comprises a plurality of crushable ribs.

17. The system of claim 13, wherein the plurality of energy-absorbing components comprises deformable posts.

18. The system of claim 13, wherein the airbag assembly is operable with one of a driver's side airbag, a passenger's side airbag, and a side curtain airbag.

19. An airbag system, comprising:
a steering wheel assembly, comprising:
a first plurality of energy-absorbing components extending from the steering wheel assembly;
a second plurality of energy-absorbing components extending from the steering wheel assembly;
an airbag assembly, comprising:
a housing configured to couple to the steering wheel assembly;
an inflator coupled to the housing; and
an airbag cushion in fluid communication with the inflator, wherein the first plurality of energy-absorbing components extend from the steering wheel assembly towards the inflator, and wherein the second plurality of energy-absorbing components extend from the steering wheel assembly towards the housing;
a first gap disposed between the inflator and at least one of the first plurality of energy-absorbing components; and
a second gap disposed between the housing and at least one of the second plurality of energy-absorbing components;
wherein the system is configured such that a force from a deployment of the airbag cushion causes the first gap and the second gap to close and results in contact between the inflator and at least one of the first plurality of energy-absorbing components, and results in contact between the housing and at least one of the second plurality of energy-absorbing components, and wherein the contact between the inflator and the at least one of the first plurality of energy-absorbing components and the housing and the at least one of the second plurality of energy-absorbing components transfers energy from the deployment of the airbag cushion from the inflator to the at least one of the first plurality of energy-absorbing components and the second plurality of energy-absorbing components.

20. The airbag system of claim 19, wherein at least one of the first plurality of energy-absorbing components and the second plurality of energy-absorbing components are crushable.

* * * * *